United States Patent

[11] 3,579,854

| [72] | Inventor | John R. Tusson |
| | | R.I. Box 683, Belle Chasse, La. 70037 |
| [21] | Appl. No. | 730,334 |
| [22] | Filed | May 20, 1968 |
| [45] | Patented | May 25, 1971 |

[54] ISOLATION OF INFORMATION
17 Claims, 10 Drawing Figs.

[52] U.S. Cl. .................................................. 35/8, 35/77
[51] Int. Cl. .................................................. G09b 3/00
[50] Field of Search .................................... 35/8, 9, 31.8, 77

[56] References Cited
UNITED STATES PATENTS

| 3,184,863 | 5/1965 | Hackl | 35/9 |
| 3,206,872 | 9/1965 | Nason et al. | 35/31(.8) |
| 3,365,820 | 1/1968 | Connell | 35/77 |

*Primary Examiner*—William H. Grieb
*Attorney*—C. Emmett Pugh

ABSTRACT: Graphic information contained in coordinated arrays is released a bit at a time by the use of an information isolating device. When an instruction mark on the device is located next to a bit of information in one array, a retrieval mark will be located next to a coordinated bit of information in another array. An endless belt or a metal clip at least in part transparent is placed about a leaf or collection of leaves containing graphic information and is moved to isolate the information.

INVENTOR
JOHN R. TUSSON

BY

ATTORNEY

ISOLATION OF INFORMATION

BACKGROUND OF THE INVENTION

This invention is concerned with a method and devices for release of graphic information, a little at a time, from a mass of said information. Devices such as masks, etc., have been put to good use in game or educational situations to hide some or all of the information on a leaf while allowing a localized portion or portions of the leaf, and the information thereon, to be viewed. Sometimes the mask is used as a mere "pacing" device for reading; or in school situations it may be used to hide the answer to a question, while the student thinks, etc. In my prior patent U.S. Pat. No. 3,235,977, a slide device is presented for releasing information, not only line by line, but character by character on the line.

I have now discovered a principle for isolation of information which may be embodied in far simpler information-isolating devices than those previously proposed. I also have discovered a novel method for isolating information in which such devices may be employed.

This invention provides a method for isolating information adaptable for use with books or other collections of leaves bearing graphic information, whether fastened together or not. In its broadest sense, the method of one aspect of this invention provides for the isolation of two or more bits of information contained in the mass of graphic information at spaced apart, but coordinated or programmed locations in the mass, by causing relative movement between the sheet containing the information and an information isolating device having indicating means spaced apart on the device and coordinated with the spacing of the bits in the mass of information. The information generally is contained on the graphic sheet material in spaced-apart coordinated arrays and often at least one of the arrays of information will be placed out of sight of the user of the method. The placement of an indicating means, herein termed the instruction indicator, at one bit of information, herein termed the instructional bit, will lead to isolation of a bit of information in the hidden array termed the retrievable bit, by another of the indicating means, herein called the retrieval indicator.

As for the arrangement of the arrays of information in the mass of graphic material, a page might be divided into two arrays, the upper part or left side with instructional text material and the lower part or right side with retrievable diagrams, as an example. A clear plastic strip having two coordinated marks, such as dots, along it could be passed over the page. An instructional indicator dot falling on the name of an object in the text material array would automatically set the retrieval dot at the diagram, for example, of the named object. This plastic strip may be foldable at about its midpoint, with the indicator marks on different sections of the strip, as defined by the fold-mark, so that when the instruction bit of information is isolated by the instructional indicator means, some time can be given to consideration of what the retrievable bit may be before this bit is actually isolated by unfolding the strip, to have the retrieval mark automatically placed adjacent the desired retrievable bit of information. Such application of the method of this invention is of particular use in educational question-and-answer situations.

In such situations it often is desirable to have the "answer" or retrievable bit completely out of view when the "question" or instructional bit is indicated. It thus is often desirable to have a book in which the pages are foldable backward along the spine of the book; one array, such as questions, may be arranged on one page while another array, for example, the answers, are on a page which faces the question page. When the pages are folded back, the question page is at the front of the book while the answer page is at the rear of the book. The device used in such a situation to isolate the related bits of information is one which fits over the book, preferably snugly, having at least one indicating means on each side of the book. The graphic material is so arranged that the instructional indicator falls on a word, number, picture, etc., on the front page while the retrieval indicator means falls over the related retrievable bit of information on the rear page. For example, the dot may fall over the diagram of a picture of a heart on the front page. The word "heart" would fall under, or next to, the dot on the back of the book. Thus, a student would move the indicator device about the page to uncover various questions and write down the answer on the device or on an answer sheet, etc., and then flip over the book to check his answer with the correct printed answer on the back page of the book. As an example, the front, instruction, indicator, might point to 2—( )=0. The student would write down 2 as the answer and flip the book over. The back, retrieval, indicator would show 2 as the correct answer. After the student finishes with the first page of questions, he slips the indicator off the book and turns the page. He slips the indicator back over the front and back of the book and is ready to work on the questions of the second page, etc.

A resilient U-shaped clip which can fit over the folded-over book can be employed. One or more indicator indicia may appear on each side of this clip, which can be employed as the other devices described, that is, the clip will be placed with one of its sides on each side of the folded-over book. Movement of the indicia on one side of the clip to a given bit of information in the array on the front of the book will automatically place an indicia on the other side of the book at the desired bit of information in the second array.

If desired, to further the purposes of any particular application of the method of this invention, a complex path can be assigned to the isolation device by providing a track in the sheet, on which the graphic material is contained, to which track the movement of the isolation device is tied.

Although various isolation devices have been described above, the isolation devices preferred for use in the method of this invention are able at least partially to encircle snugly the sheet material containing the information to be isolated. Thus a rope with its ends tied together to endless form could comprise the information isolator provided that at least one point on the rope other than the knot is given an indicator mark.

A novel device of this invention is an information isolator which comprises an endless belt which is at least in part transparent and which can be snugly placed around a leaf or collection of leaves containing graphic information and which can be provided with movement relative to the sheet material. The belt itself is of sheet material, and has means to indicate particular visual information on an exposed leaf, which can be viewed through the transparency. This transparency may be provided by the use of a transparent material or by an aperture in the belt, for example, a hole or a notch. The means to indicate ordinarily will be a boundary between the transparent section and another section which advantageously is opaque but which may merely differ in degree of transparency, color, etc.

The belt may have a plurality of transparent sections separated by less transparent sections. Coordinated bits of information may be viewed simultaneously through these transparencies or sequential viewing may be provided by arranging the transparent sections on opposite portions of the belt and/or by using supplemental masking devices to cover one of the transparent sections until viewing is desired. Thus, the belt may be used to practice the method of this invention as described above.

An example of the use of the belt with textbooks is to point out specific bits of information in diagrams on the pages of the textbook. A transparent belt with a small arrow and indicia for vertical and horizontal alignment provides for location of any spot on a diagram in a matter of seconds. This eliminates the necessity for cluttering the pages with lines, arrows, printing, etc.

The indicating belt may be used with programmed instruction materials such as adjacent coordinated arrays of information to, for example, hide printed answers which are adjacent to printed questions. At the beginning of the lesson, the opaque portion of the belt would cover the answers. After reading the first question or other frame on the exposed sheet, the student would decide what word or words should be supplied, what multiple-choice answer should be selected, etc. He could then write his answer down in the book or on an answer sheet. He might even write his answer on the belt and then rub it off when he had looked at the correct answer printed in the book uncovered by moving the transparent part of the belt to the answer corresponding to the question. The student would move the belt further with his fingers so that the transparent part of the belt uncovered additional questions and answers. The student would continue this operation until it was necessary to turn the page. He would then pull the top leaf out from under the belt and turn it to expose the questions or other material on the second page.

The indicating belt could be used also in a situation where the teacher uses a text different from but coordinated with the text for the student. For example, in beginning reading, it is advantageous for the student to be looking at a picture while he is listening to an instructor or some audio device. The student's booklet would have a belt with a window the size of a diagram (say, about 2 inches by 2 inches). The teacher would tell the student to position the belt with his fingers so that a particular diagram would show through the window of the belt. The instructor would read the material going with this diagram from the corresponding teacher's text. The student would mark his answer directly over the window in the belt (or on an answer sheet, etc., For questions and answers at the lower grade levels, it may be best to use a belt with two windows and a spiral bound book, or a case to snap over the book with the belt going around the case. Where the belt is opaque except for the instruction and retrieval windows, the belt may be positioned on a book so that the instruction window in the front would uncover the first question, simultaneously with the retrieval window in the back uncovering the answer. The belt would lock the instruction and retrieval windows into position. The belt could also be used with a transparency to isolate information on the transparency and the thus isolated information can be projected on a screen from an overhead projector. Also, an indicating belt with a window and a mask can be used to show the class, for example, first, the question and then the question along with the answer.

A belt which goes completely across the printed portion of a book, having a transparent section the width of the belt may be used as a pacer in any type of reading. Areas on the page which are made visible can be increased or decreased in size using a special two-part belt to be described below. By using a polarized belt, the student can cause movement to appear in diagrams on pages of the book as the belt is moved. Problems can be uncovered along with a space provided for student answers; another space can be uncovered by the window in the belt to show the correct answer and the student can be led to remedial material. One window in the belt can show the student a question (or problem) while a second window can reveal the answer (or solution). The answer can be in sight or out of sight as the student sees the question.

The belt can be used with material bound in book form for release of data in sequential or random fashion. By using more than one belt, each with at least one window, a variety of frames can be shown at one time as called for by the text.

The book might be so constructed as to have an opaque ribbon or one or more flexible sheets attached to one or more of the edges of the binding. This ribbon would tuck under or lay over the belt to act as a supplemental mask to hide one of a plurality of transparent sections or to vary the size of one transparent section. The ribbon could also be of a colored, light-transmitting material to provide varying visual effects. A polarized material also may be employed for this purpose.

When it is desired to isolate groups of information indicia arranged in a standard format on a sheet, such as vertically, horizontally, obliquely, etc. a small slit of the proper direction and dimensions may be provided in the belt for viewing the group of indicia without conflict with other information on the page. In some situations where the leaf or leaves to be viewed are not held rigidly enough to support and hold flat the belt, for example, a newspaper, the belt may be employed as a cylinder, the newspaper or other group of leaves being rolled into tubular form and disposed within the cylinder. In such instances, where instruction and retrieval indicators are to be provided on the belt for use with programmed information on the sheet material according to the method of this invention, the indicators, for example, apertures or transparent sections, need not be spaced as widely apart as in the book belt modification, the cylindrical form serving to hide the retrievable bit of information from the user while he attends to the instruction indicator, even though the retrievable bit may show through the retrieval aperture.

Where the cover of a book is flexible, a belt smaller than twice the length of the book cover may be employed. The book is slightly curved outwardly to fit within the belt while the belt fits snugly, in circular or semicircular fashion, against the printed indicia.

As mentioned previously, a resilient clip may be used as the information isolator and much of what has been said above in regard to the belt is applicable also to the clip embodiment of my invention. The clip generally will be resilient so as to hold the collection of leaves snugly. It will be noted that both the belt and the clip will tend by their snugness to hold a collection of leaves together. The clip may have one or more transparent sections, conveniently on either side of the clip so that arrays on a book, coordinated front-to-back when the book is folded over may be isolated simultaneously. The clip generally will be U-shaped, with at least one leg of the U conveniently being greater than 50 percent of any dimension of the sheet on which the clip is to be used. In this way the indicating mark on the clip may be used to isolate any bit of information on the sheet.

Both the clip and the belt embodiments of this invention are conveniently able to hold snugly collections of leaves which vary in girth (quasi-circumference). Thus, by using a belt which is flexible (that is, which falls to a flattened shape when not encircling a support) and somewhat resilient, the belt is of utility using a large or small collection of leaves and is usable on leaves of varying size. The allowance variance in girth also provides for greater ease in applying and removing the belt from a collection of leaves and also makes it easier to move the belt around on the collection to isolate information from the exposed sheet or sheets as desired.

In the case of the belt, the adjustability may be provided by making the belt of resilient material, by providing elastic sections in the belt, or by using a variable closure to make the belt into endless form. Although as little as 0.2 percent variation in girth of the belt still provides operability, the belt length preferably can be stretched at least about 5 percent, say about 10 percent, or even as much as 100 percent.

In the case of the clip, variations in the size of the collection of leaves may be accommodated by making the yoke portion of the U long enough to accommodate the largest collection contemplated. The resilience of the legs will provide for snugly holding smaller collections and this resilience may be brought about by the use of inherently resilient metal or plastic for the clip, by using spring-biased hinges, etc.

The information isolating device generally will cover only a portion of the exposed leaf, usually no more than about 50 percent of the leaf, advantageously, no more than 10 percent or 25 percent, and auxiliary masking devices may be used to hide other portions of the sheet. For example, the belt may be used in the situation described in my aforementioned U.S. Pat. No. 3,235,977. In this situation a chart is slowly pulled out from an envelope so that it is exposed one line at a time. The top sheet of the envelope comprises an auxiliary mask and an opaque belt having a small aperture is supported around the bottom sheet of the envelope and the collection of charts inside the envelope. Thus, as the chart is pulled, line by line, from the envelope, the aperture isolates the information in this line in small bits, as the belt is moved around the collection.

BRIEF DESCRIPTION OF THE DRAWINGS

The invention will be better understood by reference to the accompanying drawing which is to be considered illustrative only and not limiting and in which.

DESCRIPTION OF THE PREFERRED EMBODIMENTS

Figure 1:
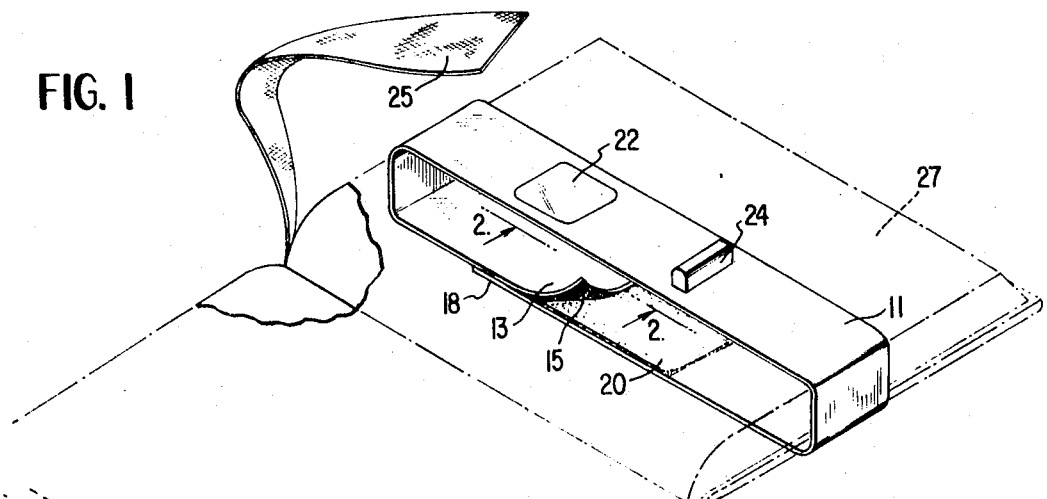
FIG. 1 shows a belt according to this invention in place around a book which is shown in phantom lines.

The indicating belt embodiment shown in FIG. 1 is one where the ends of the belt 11 may be readily detached from each other, snugly fitted around an open book for use, and the ends reattached to make the endless belt. In this modification, fastening means allow for variation in the amount by which the ends of the belt overlap. Thus the amount of overlap can be increased as the number of pages in the book to be enclosed by the belt decreases. The fastening means shown in U.S. Pat. No. 3,009,235 may be used, but the invention is not to be limited to the use of such means.

Figure 2:
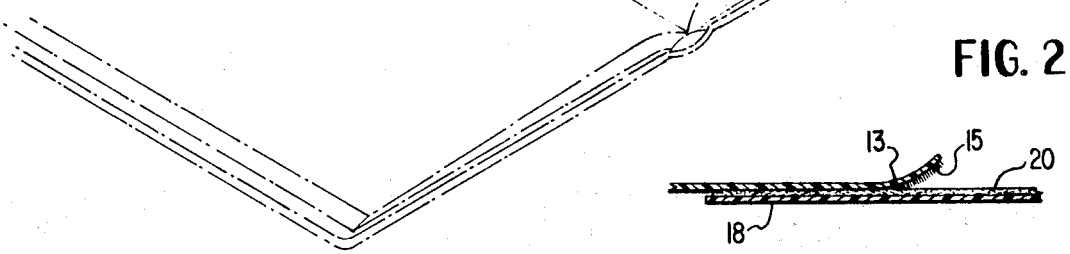
FIG. 2 is a cross-sectional view along the line 2—2 of FIG. 1.

As shown more clearly in FIG. 2, the belt may be made into endless form by providing the under surface of one end 13 of the belt 11 with the array of miniature hooks 15. The other end 18 of the belt may be provided on its upper surface with the textile like material 20 which provides a sheet of loops. The ends are attached by pressing the hooks 15 into the material 20 and may be readily detached by peeling apart the ends 13 and 15 and reattached as desired.

As can be seen, the belt 11 is of an opaque material, generally a smooth plastic, and is provided with a transparent portion 22. Visible material on the page of a book in question will be hidden by the belt 11 and when it is desired to view this material, the belt can be slid about the book until the transparent section 22 is over the material to be viewed. For easier manipulation a handle such as 24 may be provided on the belt.

FIG. 1 also shows a ribbon 25 which may be permanently or temporarily fastened into the binding of the book 27. When placed underneath or above the section 22 this ribbon, when opaque, will serve as an additional temporary mask for the indicia under the section 22 or, if of a transparent colored material, will change the indicia in other suitable ways as described above.

Figure 3:
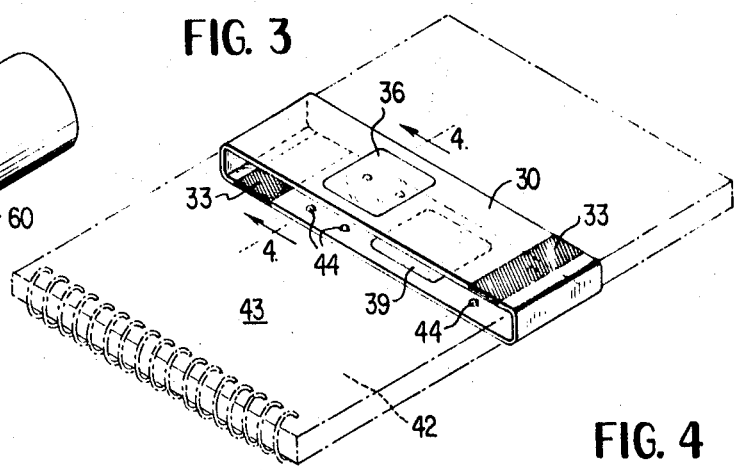
FIG. 3 shows another belt according to this invention in place around a book also shown in phantom lines.
Figure 4:
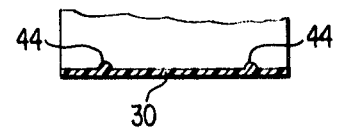
FIG. 4 is a cross-sectional view along the line 4—4 of FIG. 3.

In FIGS. 3 and 4, another embodiment of the indicating belt of this invention is illustrated. The belt 30 is endless and opaque. If made of a material lacking in inherent resilience, this belt may be provided with one or more elastic sections 33 so that it will fit snugly around the book or other assemblage of papers or written leaves with which it is to be used. The belt 30 is shown with the transparent front section or instruction indicator 36 and also the transparent rear section or retrieval mark 39 which makes practical the method of this invention when used with a flat-lying book 42 containing programmed bits of information. As described previously, the page 43 of book 42, exposed at the front, may contain an array of instructional bits of information such as questions, one of which can be isolated by the instructional window 36. The page of the book 42 exposed at the rear (hidden in the drawing) may contain an array of retrievable bits of information, such as answers, arranged on the page as to be coordinated with the questions on page 43. Thus, the retrieval window 39 will isolate and expose the desired bit of information automatically upon proper placement of the instruction window 36.

In this embodiment of the belt, or in the embodiment shown in FIG. 1, the inner surface of the belt, that is, the surface adjacent to the indicia in use, may be provided with stopping means to prevent unwanted sliding of the belt during the reading of the written material. Such stopping means may be, for instance, the projections or buttons 44.

Figure 5:
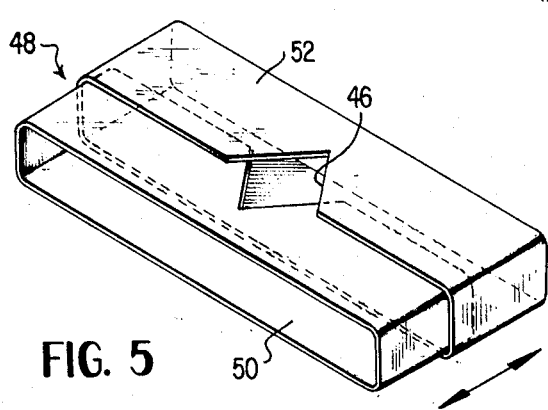
FIG. 5 shows another belt according to this invention in which the size of the aperture can be varied.

FIG. 5 shows a belt modification in which the transparent viewing section of the belt is an aperture 46. Also, the belt 48 is made in two sections 50 and 52 which advantageously can telescope, as shown, and the aperture 46 is a diamond-shaped opening, the size of which may be varied to a desired extent to isolate a small or a large section of the indicia on a page. It will also be noted that providing the belt in two or more telescoping sections allows for more ready accommodation of books, etc., varying in width.

Figure 6:
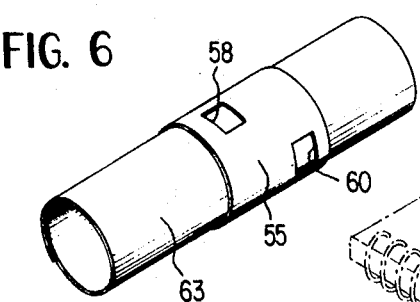
FIG. 6 shows a belt having cylindrical form being used with sheet material which is rolled up into a tube.

In FIG. 6 the belt 55 is provided with information-isolating means such as the apertures 58 and 60 for use with programmed information contained on the flexible sheet 63. By rolling the sheet 63 into cylindrical form and placing it inside the belt 55, the belt 55 will assume a cylindrical form whether it is of rigid or flexible material.

Figure 7:
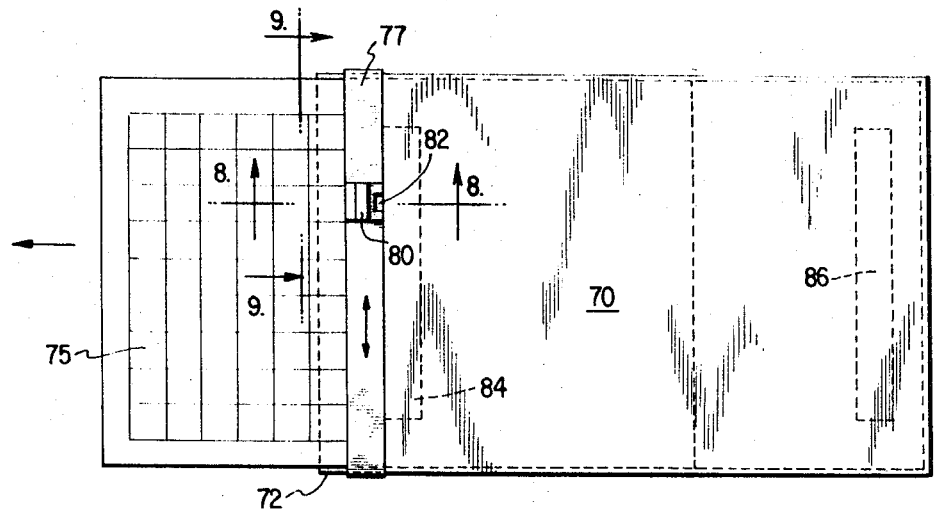
FIG. 7 shows a belt according to this invention in place around an envelope containing a collection of charts.
Figure 8:
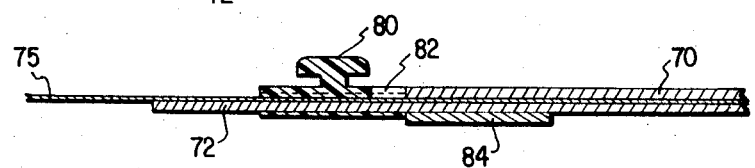
FIG. 8 is a cross-sectional view along the line 8—8 of FIG. 7.

FIG. 7 shows the use of a belt according to this invention isolating small bits of information from a chart. The chart is contained within an envelope made up of an upper sheet 70 and a lower sheet 72. These sheets may be of the same or different weights of paper or other sheet or leaf material and they may be fastened or otherwise held together by any convenient means. It will be noted that the bottom leaf 72 projects beyond the upper leaf 70 and this bottom leaf will generally be of a rather stiff cardboard. Chart leaves such as 75 are generally contained within the envelope defined by the sheets 70 and 72 and may be withdrawn through the open end of this envelope, e.g., to the left as illustrated.

Figure 9:
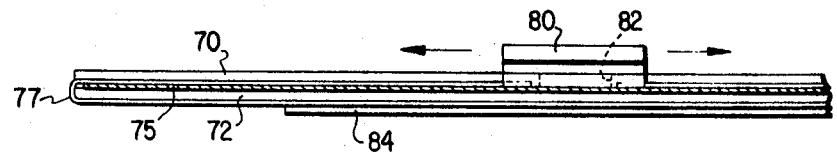
FIG. 9 is a cross-sectional view along the line 9—9 of FIG. 7.

Disposed about the chart 75 and the lower leaf 72 is the resilient, flexible belt 77, which, as shown, abuts against the upper sheet 70. Thus, the sheet 70 functions as an auxiliary mask for the belt 77 and serves to keep areas of the leaf 75 hidden until it is desired to reveal them. A handle 80 is provided on the belt for movement of the belt back and forth according to the arrows of FIGS. 7 and 9. An aperture 82 is provided, passing through both the belt 77 and the handle 80 as the information indicator.

To provide for easier movement of the belt, the lower leaf 72 may be supported by one or more legs such as 84 and 86 which advantageously are positioned so as not to interfere with complete removal of the belt 77 when desired.

Figure 10:
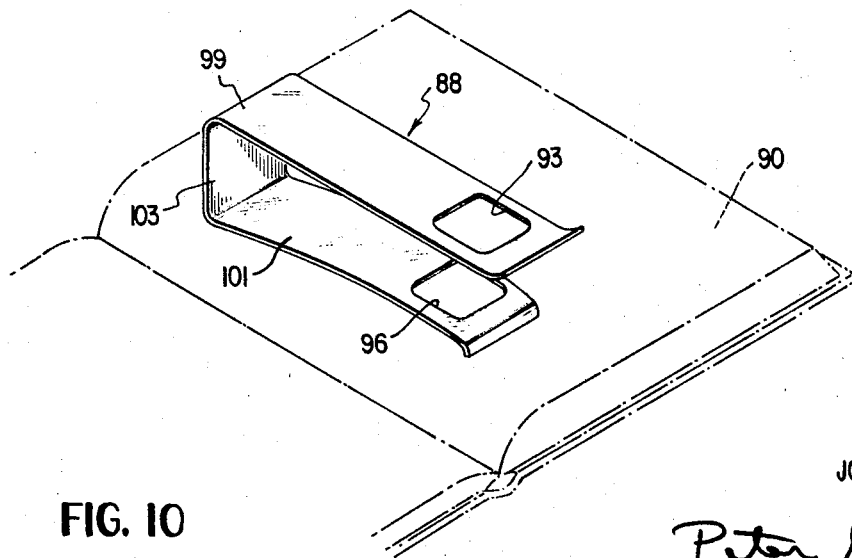
FIG. 10 shows the device of this invention embodied in a metal clip snugly engaging a book shown in phantom lines.

The resilient clip embodiment of this invention is illustrated in FIG. 10 where the clip 88 is shown partially encircling the book 90. This clip has a U-shape and is advantageously provided with the apertures 93 and 96 on either side of the book. The legs 99 and 101 are shown as being more than 50 percent of any dimension of the book so that at least one of the apertures 93 and 96 may be used to isolate information appearing anywhere on an exposed sheet of the book. It will be noted that the yoke 103 is longer than the thickness of the book so that collections of leaves varying in size may be accommodated.

The indicating belt of this invention may be made of plastic, cloth or other sheet material and can be moved in any direction, using the fingers. The student or player of a game can be instructed to insert a belt over a specific page in a book for release of data in sequential or random fashion, as discussed above or, in the embodiment shown in FIG. 6, the sheet may be moved within the cylindrical belt.

I claim:

1. A device for selectively isolating information contained on information bearing material, said material being a collection of leaves, comprising:

a band placed about the material said band having both opaque and transparent section means for selectively blocking out some information and displaying other information on the material, said band being freely movable about the face of the material, the leaves of the material being bound together and the binding being such that the leaves can be fully folded back upon themselves, the information on the top leaf being related to the information on the bottom leaf, said band having at least two transparent section means along its length separated by approximately one half of its girth, the information being displayed from the top leaf at one transparent section means being continuously keyed to the information being displayed from the bottom leaf at the other transparent section means as the band moves down or across the leaves.

2. The device of claim 1 wherein said band is continuous and flexible and completely encircles the material.

3. The device of claim 2 wherein said band has a width substantially less than the width of the material.

4. The device of claim 2 wherein said band is generally flat on its outer surface, and said device further includes handle means projecting above said surface for grasping by hand when said band is to be moved with respect to the material.

5. The device of claim 2 wherein said band is formed of a continuous belt of material overlapped upon itself at its ends, said overlapped ends being joined together by fastening means for temporarily fastening said ends and for varying the girth of said belt; whereby said belt can be adjusted for varying size material.

6. The device of claim 2, wherein said band is formed at least in part of resilient material.

7. The device of claim 6 wherein said band is provided with elastic sections to provide the resiliency.

8. The device of claim 2 wherein said band is provided on its inner surface with friction means bearing against the material for preventing unwanted sliding of the band.

9. The device of claim 3 wherein there is further included an auxiliary, generally opaque, flat element placed in immediate juxtaposition to said band, said flat element cooperating with said band to selectively block out information on the material.

10. The device of claim 9 wherein said opaque element is a rectangular card placed on one side of said band, the dimension of the side of the card placed next to said band being approximately one-half the girth of said band, all the information to that side of said band being thereby blocked out in spite of the relatively small width of said band, thereby achieving the ease of movement in using a band of relatively small dimension and yet having full information blocking-out capability.

11. The device of claim 9 wherein the information is isolated by the combined action of the movement of the band and the positioning of the material covered by the band and the opaque element.

12. The device of claim 1 wherein said band is made of elastic material and holds the material together under compression.

13. A device for selectively isolating information contained on information-bearing material, said material being at least one leaf and forming a semirigid structure, comprising:

a continuous, flexible band placed about the material encircling the material, said band having both opaque and transparent section means for selectively blocking out some information and displaying other information on the material, said band comprising two nested elements which are movable laterally with respect to one another and are fitted together in telescoping fashion, said elements being generally opaque but defining between them said transparent section means, the area of said transparent section means being variable by moving said elements laterally with respect to one another.

14. A method for isolating information by selectively displaying and blocking out information on leaves of printed material comprising the steps of:

a. providing a collection of the leaves bound together so that the leaves can be fully folded back upon themselves;

b. providing a first array of information on the back of at least a first leaf and providing a second array of information coordinated with said first array on the front of the following leaf, the coordination between said arrays being at least in part a fixed separation distance;

c. folding said first leaf over to the bottom of the collection of leaves so that said first array faces outward on the bottom of the collection of leaves and said second array faces outward on the top of the collection of leaves;

d. providing an information isolating device having two sections, a bottom and a top section, each of said sections having transparent-information isolating means whose separation measured along said device remains constant;

e. slipping said information isolating device over the collection of leaves so that said top section extends over the top leaf and said bottom section extends over said bottom leaf; and f. moving said information isolation device about the face of the leaves so that the coordinated bits of information from said first and second arrays can be easily compared and related.

15. The method of claim 14 wherein said device is a continuous flexible belt, said device being slipped over the leaves so that it forms a continuous loop over and about the leaves, said device being moved about the face of the leaves by running or slipping it about the leaves.

16. The method of claim 14 wherein said device is a resilient clip having a generally "U" shaped cross section, said device being slipped over the leaves so that its legs extend over both the bottom and top of the collection of leaves and form said sections, said device being moved about the faces of the leaves by bodily moving it about.

17. The method of claim 16 wherein at least one leg of said clip has a length of at least one-half of the shortest dimension of the leaves so that said device can be moved about over any portion of the outermost leaves of the collection of leaves.